United States Patent
Gumerman

[15] 3,684,755
[45] Aug. 15, 1972

[54] COATING COMPOSITION OF FLUOROCARBON POLYMERIC MATERIAL AND INSULATED ELECTRICAL CONDUCTORS COATED THEREWITH

[72] Inventor: Carl Gumerman, West Chester, Pa.

[73] Assignee: E. I. du Pont de Nemours and Company, Wilmington, Del.

[22] Filed: May 15, 1970

[21] Appl. No.: 37,926

[52] U.S. Cl............260/17 R, 117/128.4, 174/110, 252/63.5, 260/29.6 F, 260/29.6 RB, 260/41 A
[51] Int. Cl............................................C08f 29/16
[58] Field of Search......260/17 R, 41 A, 29.6 F, 29.6 RB

[56] References Cited

UNITED STATES PATENTS

| | | |
|---|---|---|
| 2,881,142 | 4/1959 | Eldridge...................260/17 R |
| 2,906,658 | 9/1959 | Doban......................260/41 A |
| 2,976,257 | 3/1961 | Dane et al................260/17 R |
| 3,051,677 | 8/1962 | Rexford..................260/29.6 F |
| 3,055,852 | 9/1962 | Youse......................260/17 R |
| 3,062,764 | 11/1962 | Osdal......................260/17 R |
| 3,150,207 | 9/1964 | Gore........................260/29.1 |

Primary Examiner—William H. Short
Assistant Examiner—L. M. Phynes
Attorney—Claude L. Beaudoin

[57] ABSTRACT

A coating composition is provided which is composed of between about 77 percent and about 92 percent by weight of a copolymer of tetrafluoroethylene and hexafluoropropylene (FEP) or a blend of FEP and polytetrafluoroethylene (PTFE), between about 5 percent and about 15 percent by weight of finely divided silica, and between about 3 percent and about 8 percent by weight of methyl cellulose.

5 Claims, No Drawings

COATING COMPOSITION OF FLUOROCARBON POLYMERIC MATERIAL AND INSULATED ELECTRICAL CONDUCTORS COATED THEREWITH

THE INVENTION

The present invention relates to a composition and to an article of manufacture prepared therewith. More particularly, the present invention is directed to improvements in and relating to coating compositions of fluorocarbon polymeric material such as a copolymer of tetrafluoroethylene and hexafluoropropylene (FEP) and to electrical conductors coated therewith.

Compositions of fluorocarbon polymeric material useful, for example, for coating substrates of metal, plastics, glass, etc., are well known. To illustrate, U.S. Pat. No. 2,906,658 describes a process for making surfaces of polytetrafluoroethylene cementable by coating such surfaces with a codispersion of colloidal polytetrafluoroethylene and colloidal silica and thereafter heating the coated surface to a temperature of 500° to 550°C. for a period of 0.5 to 5 minutes whereby a modified and cementable surface is obtained on the treated polytetrafluoroethylene material. Also, U.S. Pat. No. 3,058,852 describes an improved composition of a dilute dispersion of finely divided polytetrafluoroethylene particles and a cellulose ether which may be applied to a substrate material and dried thereon at ordinary room temperature without having to resort to the application of high temperatures for heating and curing the polytetrafluoroethylene coating. As indicated, the aforementioned patents, the polytetrafluoroethylene dispersion above discussed are quite satisfactory for many purposes, but they do indeed lack in certain essential performance characteristics. Specifically, the main drawback of such polytetrafluoroethylene coating dispersions resides in the lack of satisfactory printing, bonding, marking and electrostatic properties. For instance, insulated wire conductors are often printed with numerals, letters, colored stripes, and so forth, for circuit identification. Printing inks and marking foils are used for this purpose, but these do not adhere satisfactorily to the prior art coatings such as described above. Also, special treatments are necessary for bonding wire conductors coated with the above-described compositions, especially in applications where they are "potted" in a rigid or elastomeric resin which is poured in place as a liquid and cured to its final state. High adherence between the surface of the wire insulation and the potting compound is desired so that the wires are not easily pulled out of the connector terminal, and so that moisture cannot penetrate to the terminal. In order to achieve such goals with the prior art coatings, chemical treatment of the wire surface with expensive water-sensitive etchants containing alkali metal have been necessary. Avoidance of this inconvenience is desirable. Additionally, the prior art overcoatings are also prone to accumulate electrostatic charges which attract particles of dust and dirt which are retained on the wire. Such particles foul soldering operations, and cause current leakage and cuts in the insulation. Reduction of the propensity of fluorocarbon polymer coatings to accumulate electrostatic charges is highly desirable. Accordingly, it is the principal object of the present invention to provide a coating composition of fluorocarbon polymeric material that is especially adapted for insulated electrical conductors and which is printable gives improved bonds in potting, and has reduced electrostatic propensity.

According to the present invention there is provided a composition comprising between about 77 percent and about 92 percent by weight of a homopolymer of tetrafluoroethylene, a copolymer of tetrafluoroethylene and hexafluoropropylene (FEP) or a blend of FEP and polytetrafluoroethylene (PTFE), between about 5 percent and about 15 percent by weight of finely divided silica, and between about 3 percent and about 8 percent by weight of methyl cellulose. All parts and percentages expressed are by weight based upon the total weight of the composition. Preferably, the composition consists of approximately 85 percent by weight of FEP or a blend of FEP and PTFE, approximately 10 percent by weight of silica, and approximately 5 percent by weight of methyl cellulose.

According to the present invention, there is further provided an article of manufacture comprising an electrical conductor having an insulation covering bearing a coating of between about 77 percent and about 92 percent by weight of a homopolymer of tetrafluoroethylene, a copolymer of FEP or a blend of FEP and PTFE, between about 5 percent and about 15 percent by weight of finely divided silica, and between about 3 percent and about 8 percent by weight of methyl cellulose.

The composition of the present invention is comprised of a plurality of components. An essential component of the composition of the invention is a fluorocarbon polymer such as, for example, a copolymer of tetrafluoroethylene and hexafluoropropylene (FEP).

The copolymers of tetrafluoroethylene and hexafluoropropylene (FEP) referred to herein are copolymers of 50 to 95 percent by weight tetrafluoroethylene and 5 to 50 percent by weight hexafluoropropylene, of the type described in U.S. PAT. Nos. 2,833,686 and 2,946,763 (Example 1). Preferably, the amount of hexafluoropropylene is between 7 and 27 percent. The polytetrafluoroethylene (PTFE) referred to herein is a homopolymer of tetrafluoroethylene, and can be of the type described in U.S. Patent Nos. 2,559,750 and 2,559,752. The blend of FEP and PTFE referred to herein consists of between about 10 percent and about 100 percent by weight of FEP and between about 0 percent and about 90 percent by weight of PTFE, all weight percentages being based upon the total blend weight.

The silica employed in the composition of the invention is a finely divided silica, such as "Cab-O-Sil" M5 fine silica (Cabot Corporation). Amounts of silica of 20 percent or more in the coating result in coatings which feel undesirably rough.

The methyl cellulose of the topcoat is, for example, "Methocel" MC (Dow Chemical Company), 25 centipoise grade. Amounts of methyl cellulose of 10 percent or more in the coating result in coatings which become excessively discolored at temperatures of 300°C. or higher.

The coating composition of the invention may additionally contain suitable agents such as wetting and dispersing agents. These materials are not essential constituents of the coating composition of the invention, but may be employed to aid in applying the coating composition.

Typical suitable wetting agents include L–77 organosilicone wetting agent (Union Carbide Corporation), a liquid added directly to the coating dispersion, and FC–128 fluorocarbon (Minnesota Mining and Manufacturing Company), a solid first made up to a 10 percent solution in warm water before adding it. The chemical nature of these materials is not known to us.

Typical suitable dispersing agents include TLF–1800 wetting agent Du Pont), "Triton" X–100 (Rohm and Haas) and "Syloid" 244 silica (Davison Chemical Company). TLF–1800 and "Triton" X–100 are preferred to "Syloid" 244 since the latter, because of its nature, gives the coating a matte surface.

The composition of the invention may easily be prepared by first mixing the methyl cellulose component into the aqueous fluoropolymer dispersion. An aqueous solution of the former is prepared by dispersing it in boiling water and then cooling it, for example by adding more water. The silica component is dispersed in water in a high shear stirrer (blender) before mixing it into the aqueous fluorocarbon polymer dispersion.

The insulated electrical conductors to be coated in accordance with this invention can be those which are insulated with polyimide or combinations of polyimide and fluorocarbon polymer. For instance, the insulated electrical conductors are any metallic conductors insulated with a polyimide or a polyamide-imide, or either of these in combination with a fluorocarbon polymer such as FEP or PTFE. The polyimide may be of any type, for example, as described in U.S. Pat. No. 3,179,634, or U.S. Pat. No. 3,190,856. The polyamide-imides are described in U.S. Pat. No. 3,179,635 and U.S. Pat. No. 3,260,691. The conductor may also be insulated solely with a fluorocarbon polymer applied either by extrusion or by dispersion coating, as well known in the art.

The coating composition of the invention is prepared in aqueous form and will generally consist of about 5 to 20 percent by weight solids (polymer, silica and methyl cellulose) and about 80 to 95 percent by weight water and wetting agent. Ordinarily, the coating dispersion will be about 10 percent solids.

The coating of the invention is applied to such insulated electrical conductors from an aqueous coating bath, followed by heating to dry the coating and to sinter the polymeric coating to form a complete continuous coating on the insulated conductor. Multiple passes through the coating bath and drying oven are customarily taken in order to achieve the desired coating thickness for adequate toughness, chemical resistance and hiding power. A coating thickness of at least 0.5 mil is normally desired. The number of passes required will vary with such factors as the percent solids of the coating dispersion. Drying temperatures of 470°C. are satisfactory, but will depend somewhat on process variables including oven length, wire gauge, wire speed, composition of coating and so forth.

As indicated hereinabove, the aqueous dispersion coating bath may also contain a suitable wetting agent which aids to spread the coating evenly as it is applied onto the insulated conductor. The amount of wetting agent will generally fall in the range of about 0.5 to 2 percent by weight of the aqueous coating dispersion, and will ordinarily be about 1 percent by weight. It is believed that some, but not all, of the wetting agent is volatilized during the drying operation. Though a small amount may be retained in the coating, it is not included in the defined coating composition as it is not an essential constituent of the coating, but is employed only to aid in applying the coating.

The advantages of the coating composition of the invention over known coatings is that it is printable, gives good bonds in potting, and has reduced electrostatic propensity. Also, wires topcoated in accordance with this invention, when bundled into cable and overwrapped with polyimide/fluorocarbon polymer tapes which are then heat-sealed, have less tendency to stick to one another than do wires topcoated with compositions not containing silica and methyl cellulose.

The principle and practice of the present invention will now be illustrated by the following Examples which are provided to show the practice and use thereof, but it is not intended that the invention be limited thereto since modifications in technique and operation will be apparent to anyone skilled in the art. All parts and percentages in the following examples are by weight unless otherwise indicated.

EXAMPLES 1–6

Number 20 American Wire Gauge nickel plated copper conductor insulated with two wraps of heat-sealed polyimide/fluorocarbon polymer tape (first wrap of 1-mil polimide/0.5-mil FEP tape applied with 50 percent overlap and the polyimide surface contacting the metal conductor; second wrap of 0.1 mil FEP/1-mil polyimide/0.1-mil FEP tape applied with 50 percent overlap; the whole passed through an oven to heat-seal it) was first overcoated with a pigmented FEP aqueous dispersion coating.

The pigmented FEP coating composition was made up of 793 parts (all parts are by weight) of "Teflon" 120 FEP Fluorocarbon Resin (Aqueous Dispersion, 56.8 percent solids), 900 parts of 50 percent by weight aqueous paste of "Ti-Pure" R–900 titanium dioxide (Du Pont Company), 30 parts of TLF–1800 dispersing agent (Du Pont Company), 30 parts of L–77 organosilicone wetting agent and 1,247 parts of water. As some of the ingredients contained water, the bath composition was 450 parts FEP resin, 450 parts titanium dioxide pigment, 30 parts TLF–1800, 30 parts L–77 and 2,040 parts water. The coating bath was 30 percent solids (polymer and pigment). The above-described tape-insulated wire was coated by taking five dips through this aqueous dispersion coating bath, and drying and sintering the coating by passing the wire following each dip through an oven whose final zone was at 470°C. The resulting coating consisted essentially of 50 percent by weight FEP resin and 50 percent by weight titanium dioxide.

The resulting wire was then coated with one of six different aqueous dispersion coating baths which were prepared by combining amounts of "Teflon" 120 FEP Fluorocarbon Resin (Aqueous Dispersion), "Methocel " MC methyl cellulose (25 centipoise grade), "Cab-O-Sil" M5 fine silica, L–77 organosilicone and water, as indicated in Table I below, wherein amounts of ingredients are indicated in parts by weight. The bath compositions are shown in both parts by weight and percent by weight in Table II below. Portions of the wire were coated by taking three dips through one of the aqueous dispersion coating baths, and drying and sintering the coating by passing the wire following each dip through an oven at 470°C.

The compositions of the resulting topcoatings are shown in Table III below, along with data showing electrostatic propensity and surface wettability (which correlates with ability to bond).

Electrostatic propensity is denoted by the charge on the surface of the wire as measured by an electrostatic voltmeter after the wire is rubbed with a cotton velveteen cloth. It will be seen that the combination of silica and methyl cellulose results in a synergistic effect, that is, the reduction in electrostatic propensity brought about by the combination is far greater than that expected from the additive effect of the two components singly.

Surface wettability was estimated by determining which of a series of methanol-water solutions would or would not wet the surface. The wettability is indicated therefore as two numbers, the surface tension of the last solution which wet the surface, and the surface tension of the first solution which did not wet the surface, when testing in the order of increasing concentration of water.

The wire of Example 6, which is coated with the preferred composition readily accepts hot stamp printing with marking foils such as K-486 and PFP-16 (Kingsley) and 5,019 and 8,034 (Howmetfoils), while the wire of Example 1 accepts such printing only with erratic, lower adhesion.

In potting tests, the wire of Example 6 was compared against that of Example 1 and also Example 1 modified by a standard sodium etch treatment. In some cases, a primer was painted onto the wire of Example 6 and allowed to air dry. The two-part potting compounds were mixed and poured into small cups around the wires, cured at room temperature overnight, and finally oven-cured in accordance with the manufacturer's recommendations. The wires were pulled out of the potting compounds on a tensile testing machine. The results, given in Table IV below, are expressed as a shear stress, the pounds of pull-out force divided by the area of wire surface in contact with the potting compound.

TABLE I.—INGREDIENTS OF COATING BATHS
(Parts by weight)

| Ex. | Teflon 120 FEP | Cab-O-Sil M5 silica | Methocel MC | L-77 organo-silicone | Water |
|---|---|---|---|---|---|
| 1 | 880 (56.8% solids) | | | 20 | 1,100 |
| 2 | 335 (56.8% solids) | | 10 | 20 | 1,635 |
| 3 | 317 (56.8% solids) | | 20 | 20 | 1,643 |
| 4 | 489 (55.2% solids) | 30 | | 15 | 966 |
| 5 | 238 (56.8% solids) | 7.5 | 7.5 | 15 | 1,232 |
| 6 | 231 (55.2% solids) | 15 | 7.5 | 15 | 1,231.5 |

TABLE II.—COMPOSITION OF COATING BATHS
(Parts by weight/percent by weight)

| Ex. | Solids[1] | Water | FEP | Silica | Methyl cellulose | Wetting agent |
|---|---|---|---|---|---|---|
| 1 | 500/25 | 1,480/74 | 500/25 | | | 20/1 |
| 2 | 200/10 | 1,780/89 | 190/9.5 | | 10/0.5 | 20/1 |
| 3 | 200/10 | 1,780/89 | 180/9 | | 20/1 | 20/1 |
| 4 | 300/20 | 1,185/79 | 270/18 | 30/2 | | 15/1 |
| 5 | 150/10 | 1,335/89 | 135/9 | 7.5/0.5 | 7.5/0.5 | 15/1 |
| 6 | 150/10 | 1,335/89 | 127.5/8.5 | 15/1 | 7.5/0.5 | 15/1 |

[1] Polymer, silica and methyl cellulose.

TABLE III.—COATING COMPOSITIONS
(Percent by weight)

| Example | FEP | Silica | Methyl cellulose | Electrostatic propensity (volts) | Wettability (dynes/cm.) |
|---|---|---|---|---|---|
| 1 | 100 | | | 640 | <25.5 |
| 2 | 95 | | 5 | 420 | 41-45 |
| 3 | 90 | | 10 | 260 | 41-45 |
| 4 | 90 | 10 | | 600 | 25-30 |
| 5 | 90 | 5 | 5 | 310 | 45-51 |
| 6 | 85 | 10 | 5 | 74 | 45-51 |

TABLE IV.—POTTING TESTS
(Shear stress, p.s.i.)

| | | Topcoat | | |
|---|---|---|---|---|
| Potting compound* | Primer* | Ex. 1 | Ex. 1 with sodium etch | Ex. 6 |
| PR1933-2 (silicone) | PR1903 | 40 | 180 | 180 |
| PR1935 (polyurethane) | None | 70 | 560 | 280 |
| PR1201Q (polysulfide) | None | 60 | 210 | 60 |
| PR1201Q | PR420 | | | 240 |
| PR1201Q | PR1005-L | | | 150 |
| PR1201Q | PR1543M | | | 160 |

*All potting compounds and primers carrying "PR" designations obtained from Product & Chemical Corporation.

EXAMPLE 7

A pigmented FEP/PTFE coating composition was made up of 163 parts of "Teflon" 120 FEP Fluorocarbon Resin (Aqueous Dispersion, 55.2 percent solids), 598 parts of "Teflon" 30 TFE Fluorocarbon Resin (Aqueous Dispersion, 60.2 percent solids), 900 parts of 50 percent by weight aqueous paste of "Ti-Pure" R-900 titanium dioxide, 30 parts of TLF-1800 dispersing agent, 30 parts of L-77 organosilicone wetting agent and 1,279 parts of water. As some of the ingredients contained water, the bath composition was 90 parts FEP resin, 360 parts PTFE resin, 450 parts titanium dioxide, 30 parts TLF-1800, 30 parts L-77 and 2,040 parts water. The coating bath was 30 percent solids (polymer and pigment). Tape-wrapped insulated wire as described in the first paragraph of Examples 1-6 was coated by taking five dips through this aqueous dispersion bath, and drying and sintering the coating by passing the wire following each dip through an oven whose final zone was at 470°C. The resulting coating consisted essentially of 10 percent by weight FEP resin, 40 percent by weight PTFE resin and 50 percent by weight titanium dioxide.

A topcoating bath was prepared by combining 46.2 parts of "Teflon" 120 FEP Fluorocarbon Resin (Aqueous Dispersion, 55.2 percent solids), 169.4 parts of "Teflon" 30 TFE Fluorocarbon Resin (Aqueous Dispersion, 60.2 percent solids), 7.5 parts of "Methocel" MC methyl cellulose, 15 parts of "Cab-O-Sil" M5 fine silica, 15 parts of L-77 organosilicone and 1,246.9 parts of water. As some of the ingredients contained water, the bath composition was 25.5 parts FEP resin, 102 parts PTFE resin, 7.5 parts methyl cellulose, 15 parts silica, 15 parts L-77 and 1,335 parts water. The coating bath was 10 percent solids (polymer, silica and methyl cellulose). The wire of the previous paragraph was topcoated by taking three dips through this coating bath, and drying and sintering the coating by passing the wire following each dip through an oven, again finally at 470°C. The resulting topcoating consisted essentially of 85 percent by weight fluorocarbon polymer (consisting of FEP resin and PTFE resin in a 20:80 ratio), 10 percent by weight silica and 5 percent by weight methyl cellulose.

EXAMPLE 8

Number 20 American Wire Gauge silver plated copper conductor insulated with a 10-mil extruded layer of polytetrafluoroethylene (type E wire, Military Specification MIL-W-16878) was topcoated with the topcoating bath of Example 6. Three dips in the bath were taken at a speed of 7.5 ft./min., and following each dip the wire was passed through an oven whose final zone was at 470°C. to dry and sinter the coating.

The above wire before topcoating had an electrostatic propensity of 280 volts. After topcoating the wire had an electrostatic propensity of 32 volts.

The topcoated wire was primed with PR 420 and potted in PR 1201 Q. The shear stress upon pulling the wire from the potting compound averaged 234 psi.

What is claimed is:

1. A composition consisting essentially of between about 77 percent and about 92 percent by weight of a fluorocarbon polymer selected from the group consisting of tetrafluoroethylene homopolymer, a copolymer of tetrafluoroethylene and hexafluoropropylene and a blend of tetrafluoroethylene/hexafluoropropylene copolymer and polytetrafluoroethylene; between about 5 percent and about 15 percent by weight of finely divided silica; and between about 3 percent and about 8 percent by weight of methyl cellulose.

2. The composition of claim 1 wherein said fluorocarbon polymer is a copolymer of tetrafluoroethylene and hexafluoropropylene.

3. The composition of claim 1 wherein said fluorocarbon polymer is a homopolymer of tetrafluoroethylene.

4. The composition of claim 1 wherein said fluorocarbon polymer is a blend of tetrafluoroethylene/hexafluoropropylene copolymer and polytetrafluoroethylene.

5. The composition of claim 1 having about 85 percent by weight of tetrafluoroethylene/hexafluoropropylene copolymer or a blend of tetrafluoroethylene/hexafluoropropylene copolymer and polytetrafluoroethylene, about 10 percent by weight of said silica, and about 5 percent by weight of methyl cellulose.

* * * * *